United States Patent
Salam et al.

(10) Patent No.: US 10,504,025 B2
(45) Date of Patent: Dec. 10, 2019

(54) PARALLEL PROCESSING OF DATA BY MULTIPLE SEMANTIC REASONING ENGINES

(71) Applicant: CISCO TECHNOLOGY, INC., San Jose, CA (US)

(72) Inventors: Samer Salam, Vancouver (CA); Eric A. Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 941 days.

(21) Appl. No.: 14/657,930

(22) Filed: Mar. 13, 2015

(65) Prior Publication Data
US 2016/0267384 A1 Sep. 15, 2016

(51) Int. Cl.
*G06N 5/02* (2006.01)
*H04L 12/24* (2006.01)
(52) U.S. Cl.
CPC ......... *G06N 5/025* (2013.01); *H04L 41/0873* (2013.01); *H04L 41/0893* (2013.01); *H04L 41/145* (2013.01)
(58) Field of Classification Search
None
See application file for complete search history.

(56) References Cited

U.S. PATENT DOCUMENTS

| | | | |
|---|---|---|---|
| 8,341,173 B2 | 12/2012 | Li et al. | |
| 8,423,501 B2 | 4/2013 | Wu et al. | |
| 9,628,553 B2 | 4/2017 | El Defrawy et al. | |
| 2008/0222287 A1 | 9/2008 | Bahl et al. | |
| 2011/0087629 A1 | 4/2011 | B'Far et al. | |
| 2012/0197631 A1 | 8/2012 | Ramani et al. | |
| 2012/0278788 A1 | 11/2012 | Crapo | |
| 2013/0080459 A1 | 3/2013 | Li et al. | |
| 2013/0246315 A1 | 9/2013 | Joshi et al. | |
| 2014/0279820 A1 | 9/2014 | MacPherson | |

(Continued)

FOREIGN PATENT DOCUMENTS

CN 103645948 A 3/2014

OTHER PUBLICATIONS

Barbieri, Davide Francesco, et al. "Incremental reasoning on streams and rich background knowledge." Extended Semantic Web Conference. Springer, Berlin, Heidelberg, 2010.*

(Continued)

*Primary Examiner* — Daniel T Pellett

(57) ABSTRACT

An example method executed by a semantic reasoner is disclosed. The method includes identifying, from a plurality of rules, one or more pairs of chained rules, and, from the one or more pairs of chained rules, assigning rules chained together to a respective rule-set of P rule-sets. The method also includes assigning individuals, from a plurality of individuals referenced by the plurality of rules, referenced by each rule-set of the P rule-sets to an individual-set associated with the each rule-set and mapping the rules from the each rule-set and the individuals from the individual-set associated with the each rule-set into a respective knowledge base instance associated with the each rule-set. Such a method ensures knowledge completeness and sound inference while allowing parallel semantic reasoning within a given stream window.

20 Claims, 4 Drawing Sheets

(56) References Cited

U.S. PATENT DOCUMENTS

2016/0292574 A1    10/2016    Salam et al.
2016/0292581 A1    10/2016    Voit et al.

OTHER PUBLICATIONS

Wang, Zheng, and Michael FP O'Boyle. "Partitioning streaming parallelism for multi-cores: a machine learning based approach." Proceedings of the 19th international conference on Parallel architectures and compilation techniques. ACM, 2010.*
Hu, Han, et al. "Toward scalable systems for big data analytics: A technology tutorial." IEEE access 2 (2014): 652-687.*
Horrocks, Ian, et al. "SWRL: A semantic web rule language combining OWL and RuleML." W3C Member submission21.79 (2004): 1-31. (Year: 2004).*
EPO Jan. 5, 2017 Search Report and Opinion from European Application Serial No. 16154563.
Soma, Ramakrisna, et al., "Parallel Inferencing for OWL Knowledge Bases," $37^{th}$ International Conference on Parallel Processing 2008, ICPP '08, Piscataway, NJ, Sep. 9, 2008; 8 pages.
Margara, Alessandro, et al., "Streaming the Web: Reasoning over dynamic data," Web Semantics: Science, Services and Agents on the World Wide Web, vol. 25, Mar. 1, 2014, 21 pages.
English translation of First Office Action and Search Report in corresponding Chinese Application No. 201610141086.9, dated Jan. 22, 2018, 14 pgs.
Attenberg, Josh, et al., "Chapter 1—Selective Data Acquisition for Machine Learning," first published on or about Jun. 8, 2013; 45 pages.
Badea, Liviu, et al., "Semantic Web Reasoning for Ontology-Based Integration of Resources," Proceedings of PPSWR $2^{nd}$ International Workshop, Principals and Practices of Semantic Web Reasoning, St. Malo, France, Sep. 2004; 15 pages.
Barbieri, Davide, et al., "Stream Reasoning: Where We Got So Far," Proceedings of the NeFoRS 2010 Workshop, co-located with ESWC2010, Heraklion, Greece, May 30, 2010; 7 pages.
Della Valle, Emanuel, et al., "It's a Streaming World! Reasoning upon Rapidly Changing Information," The Semantic Web, published in IEEE Intelligent Systems, Nov./Dec. 2009, pp. 83-89.
Gupta, Anoop, et al., "High-Speed Implementations of Rule-Based Systems," ACM Transactions on Computer Systems, vol. 7, No. 2, May 1989, pp. 119-146.
Gupta, Anoop, et al., "Parallel Execution of Prolog Programs: A Survey," ACM Transactions on Programming Languages and Systems, vol. 23, No. 4, Jul. 2001, pp. 472-602.
Heino, Norman, et al., "RDFS Reasoning on Massively Parallel Hardware," Proceedings of the International Semantic Web Conference (ISWC) 2012, Boston, MA, Nov. 11-15, 2012; 16 pages.
Office Action in counterpart European Application No. 16154563.7, dated Mar. 6, 2018, 9 pages.
Masnadi-Shirazi, Hamed, et al., "Asymmetric Boosting," Proceedings of the $24^{th}$ International Conference on Machine Learning, Corvallis, OR, Jun. 24-24, 2007; 8 pages.
Masnadi-Shirazi, Hamed, et al., "Risk Minimization, Probability Elicitation, and Cost-Sensitive SVMs," Proceedings of the $27^{th}$ International Conference on Machine Learning, Haifa, Israel, Jun. 21-24, 2010; 8 pages.
Masnadi-Shirazi, Hamed, et al., High Detection-rate Cascades for Real-Time Object Detection, Proceedings of the IEEE $11^{th}$ Conference on Computer Vision, Rio de Janiero, Brazil, Oct. 14-20, 2007; 6 pages.
O'Brien, Deirdre, et al., "Cost-Sensitive Multi-class Classification from Probability Estimates," Proceedings of the $25^{th}$ International Conference on Machine Learning, Helsinki, Finland, Jul. 5-9, 2008; 8 pages.
Priya, Sambhawa, et al., "Partitioning OWL Knowledge Bases for Parallel Reasoning," ICSC 2014; 2014 IEEE International Conference on Semantic Computing, Jun. 16-18, 2014, Newport Beach, CA; 8 pages.
Spanos, Dimitrious-Emmanuel, et al., "SensorStream: A Semantic Real-Time Stream Management System," International Journal of Ad Hoc and Ubiquitous Computing (IJAHUC), vol. 11 No. 2/3, pp. 178-193, Inderscience Enterprises Ltr. Nov. 2012; 18 pages.
Antonio Brogi, et al., "Semantics-Based Composition-Oriented Discovery of Web Services", ACM Transactions on Internet Technology, vol. 8, No. 4, Article 19, Sep. 2008, 39 pages.
Ramakrishna Soma, et al., "Parallel Inferencing for OWL Knowledge Bases", 2008 37th International Conference on Parallel Processing, Sep. 9-11, 2008, ISSN: 0190-3918, 8 pages.
Dan Pescaru, et al., "Ensemble based traffic light control for city zones using a reduced number of sensors", Transportation Research Part C: Emerging Technologies, vol. 46, Sep. 2014, 13 pages.
Laura K. Dillon, et al., "Lightweight Analysis of Operational Specifications Using Inference Graphs", Proceedings of the 23rd International Conference on Software Engineering, ICSE 2001, May 19, 2001, Toronto, Ontario, Canada, 11 pages.
English translation of the Second Office Action in counterpart Chinese Application No. 201610141086.9, dated Sep. 25, 2018, 14 pages.
English translation of the Third Office Action in counterpart Chinese Application No. 201610141086.9, dated May 10, 2019, 11 pages.
Nebel, Bernhard et al., "Ignoring Irrelevant Facts and Operators in Plan Generation," European Conference on Planning, Springer, Berlin, Heidelberg, Sep. 1997, 13 pages.
Unknown, "Configuration management database," Wikipedia, 4 pages, captured Mar. 13, 2015; http://en.wikipedia.org/wiki/Configuration_management_database.
Clemm et al., "Mounting YANG-Defined Information from Remote Datastores," draft-clem-netmod-mount-01.txt, Sep. 22, 2013, 29 pages.
Unknown, "Home," 2 pages, captured Mar. 11, 2015; http://streamreasoning.org/.
Unknown, "Rete algorithm," Wikipedia, 10 pages, last updated Mar. 30, 2019; http://en.wikipedia.org/wiki/Rete_algorithm.
Desai, Kanchan et al., Red Hat JBoss BRMS 6.0 Development Guide, Red Hat, Inc., last updated Nov. 17, 2017, 159 pages.
Unknown, "Protege 3.5 Alpha released with Drools SWRLTab support," Drools & jBPM, Mar. 24, 2012, 8 pages; http://blog.athico.com/2012/03/protege-35-alpha-released-with-drools.html.
Unknown, "R.I.P. Rete time to get PHREAKY," Drools & jBPM, Nov. 1, 2013, 8 pages; http://blog.athico.com/2013/11/rip-rete-time-to-get-phreaky.html.
Unknown, "RDF Stream Models," RDF Stream Processing Community Group, 5 pages, last modified Sep. 19, 2014; https://www.w3.org/community/rsp/wiki/RDF_Stream_Models.
Unknown, "Learn OWL and RDFS," 6 pages, last indexed May 16, 2012; https://www.cambridgesemantics.com/blog/semantic-university/learn-owl-rdfs/owl-101/.

* cited by examiner

PARALLEL PROCESSING OF DATA BY MULTIPLE SEMANTIC REASONING ENGINES

TECHNICAL FIELD

This disclosure relates in general to the field of communications and, more particularly, to data control and management using semantic reasoners.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example computer-implemented method executed by a semantic reasoner, e.g. a semantic reasoner in a network, is disclosed. The method includes identifying, from a plurality of rules, one or more pairs of chained rules, and, from the one or more pairs of the identified chained rules, assigning all rules chained together to a respective rule-set of P rule-sets. The method further includes identifying a plurality of individuals referenced by the plurality of rules, and, from a plurality of individuals referenced by the plurality of rules, assigning all individuals referenced by each respective rule-set of the P rule-sets to an individual-set (referred to herein as a "window pane") associated with the each respective rule-set (i.e., there is a one-to-one correspondence between rule-sets and individual-sets where each rule-set is associated with one and only one individual-set and vice versa). The method also includes mapping the rules from the each respective rule-set and the individuals from the individual-set associated with the each respective rule-set into a respective knowledge base (KB) instance associated with the each respective rule-set (i.e., there is a one-to-one correspondence between rule-sets and KB instances where each rule-set is associated with one and only one KB instance and vice versa; similarly, there is one-to-one correspondence between individual-sets and KB instances).

Since embodiments of the method described herein involve manipulation of one or more windowpanes, a functional entity within a network element performing embodiments of the method described herein will be referred to in the following as a "window pane pre-processor." As will be appreciated by one skilled in the art, aspects of the present disclosure, in particular the functionality of the window pane pre-processor described herein, may be embodied as a system, a method or a computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing network elements such as the existing routers, switches, various control nodes, etc.) or be stored upon manufacturing of these devices and systems.

Example Embodiments

Figure 1:
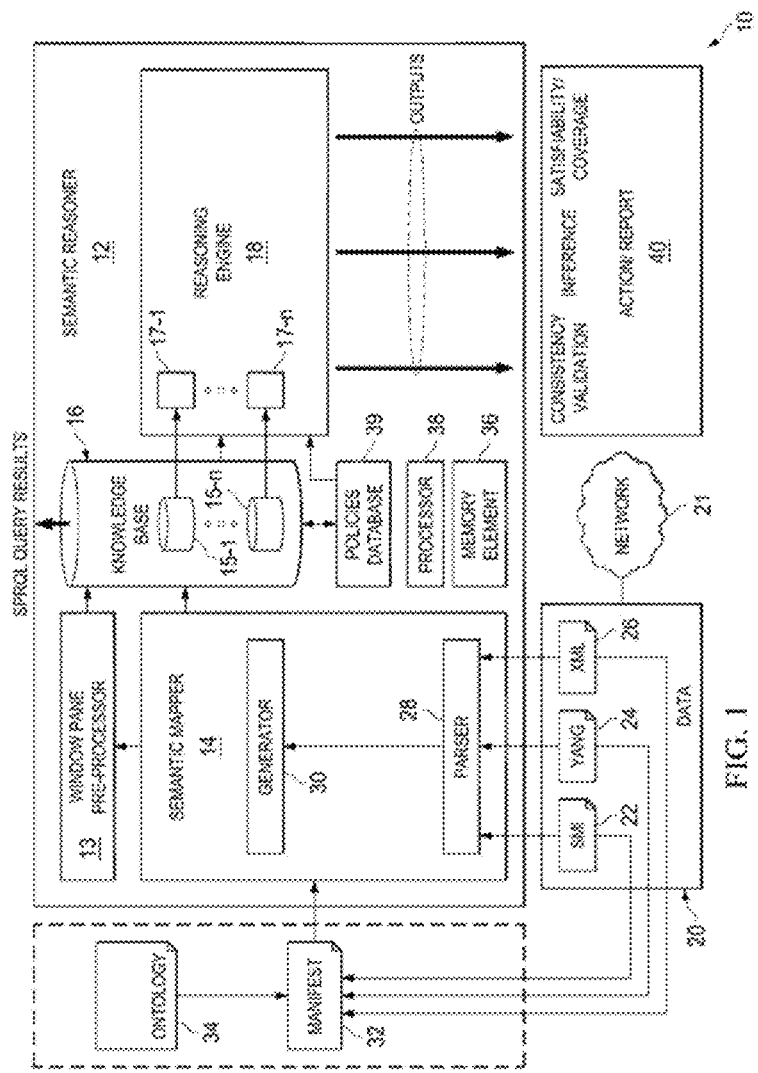
FIG. 1 is a simplified block diagram illustrating a communication system for facilitating network control and management using semantic reasoners in a network environment, according to an embodiment of the present disclosure.

Turning to FIG. 1, FIG. 1 is a simplified block diagram illustrating a communication system 10 for facilitating network data control and management using semantic reasoners in a network environment in accordance with one example embodiment. While embodiments described herein are explained with reference to network data, base network ontology, network knowledge base, etc., the functionality described herein, in particular the functionality of a window pane pre-processor, can be implemented to process any type of data, not necessarily network data, and is applicable to any environments, not necessarily a network environment. For example, embodiments described herein may be implemented with respect to machine reasoning over sensor data (e.g. sensor clouds of Semantic Sensor Networks, SSNs) or over web data (e.g. social network feeds).

FIG. 1 illustrates a communication system 10 comprising a semantic reasoner 12 comprising a semantic mapper 14, a knowledge base (KB) 16, e.g. a network KB, and a reasoning engine 18. Data 20, e.g. network data, from a system 21, e.g. network 21, may be fed into the semantic reasoner 12 in any suitable format, for example (without limitation), Structure of Management Information (SMI) 22, YANG 24, or Extensible Markup Language (XML) 26. According to various embodiments, a parser sub-module 28 and a generator sub-module 30 in the semantic mapper 14 may cooperate with a window pane pre-processor 13 to dynamically and automatically populate the KB 16 with data extracted from the network data 20 e.g. using a manifest 32 according to a base ontology 34, e.g. base network ontology 34. A memory element 36 and a processor 38 may facilitate the various operations performed by any elements of the semantic reasoner 12, in particular the operations performed by the window pane pre-processor 13. The reasoning engine 18 may perform machine reasoning on content in the KB 16, for example, using policies and rules from a policies database 39, and generate action(s) or report(s) 40 appropriate for controlling and managing the network 21. Note that the action/report 40 may include any suitable action or report, including remedial action and reports, notification actions and informational reports.

In a general sense, an ontology formally represents knowledge as a hierarchy of concepts within a domain (e.g., a network), using a shared vocabulary to denote types, properties and interrelationships of the concepts. In particular, a "base network ontology" (e.g., 34) of a network (e.g., 21) comprises an explicit representation of a shared conceptualization of the network, providing a formal structural framework for organizing knowledge related to the network as a hierarchy of inter-related concepts. The shared conceptualizations include conceptual frameworks for modeling domain knowledge (e.g., knowledge related to the network, content specific protocols for communication among devices and applications within the network, etc.); and agreements about representation of particular domain theories. In a general sense, the base network ontology 34 may be encoded in any suitable knowledge representation language, such as Web Ontology Language (OWL).

As used herein, the term "manifest" refers to a list of bindings (e.g., mappings) between a data definition format (e.g., SMI version 2 (SMIv2), YANG, XML, etc.) and ontology components. In some embodiments, the manifest 32 may be relatively static in nature, and may be developed based on the associated base network ontology 34 and SMI/YANG/XML, etc. of the network data 20 being mapped. As the base network ontology 34 evolves (e.g., is updated), the manifest 32 may be updated accordingly (e.g., by a human operator).

An importance of technical implications of implementing a semantic reasoner such as the reasoner 12 shown in FIG. 1 may not be underappreciated. With the ever-increasing amount of data-generating devices being deployed in all kind of systems, processing the generated data with minimal, if any at all, human intervention becomes crucial to the usefulness of inventing and deploying such devices. After all, a system of e.g. sensors cannot yield any technical effect unless data measured by these sensors can be meaningfully processed so that it can be acted upon. Thus, the technical effect of implementing such devices resides in the implementation of semantic reasoners capable of performing machine reasoning over the data generated by the devices.

For purposes of illustrating the techniques of the communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In today's complex Information Technology (IT) environments, operation involves managing and reasoning over large volumes of data that span at least the following broad categories: (1) business rules that dictate overall system behavior and outcomes; (2) policy definitions that govern connectivity patterns and control-plane operation; (3) device configurations that are subject to software and/or hardware capabilities and limitations; and (4) operational soft-state data including e.g. routing tables, statistics, etc. that can be used for Big Data analytics. Whereas multiple network management and operations, administration and management (OAM) tools exist, network operation continues to be a high-touch task that requires human involvement to interpret the data or configure policies based on technical or business contexts.

Software defined networking (SDN) promises to reduce human involvement by having applications declare their intent programmatically to controllers, and the latter drive the operation of the network. Integral to the success of SDN is network management and control logic with the ability to reason over various network data categories. Such reasoning involves detecting policy violations; reconciling between conflicting policy definitions; detecting unintended consequences and reverting to stable state; and inferring network configuration based on intent and contextual information, among other features. The reasoning can be mechanized using semantic technologies, including ontology languages (e.g., Web Ontology Language (OWL), OWL-Descriptions Logics (OWL-DL), resource description framework (RDF), Semantic Web Rule Language (SWRL), etc.); ontology editors (e.g., Protege); semantic frameworks (e.g., Sesame); and semantic reasoners (e.g., Pellet, HermIT, FaCT++, etc.).

A relatively recent and not yet adequately addressed problem that needs to be handled by any solution is coping with fast changing data, e.g. streaming data. In many use-cases, reasoning is required over network elements' soft-state, such as interface statistics or protocol Finite State Machine (FSM) state, routing table content, etc. This type of continuously changing data creates a challenge for current semantic reasoners, which traditionally operate over static digital knowledge bases.

Stream Reasoning is an emerging area of academic research that has come into the limelight in the last few years, primarily motivated by the need to provide solutions that would enable machine reasoning over heterogeneous streaming data (sensors, social networks, etc.).

One current approach within Stream Reasoning introduces the concepts of "Window" and "continuous processing" as key elements of Stream Reasoning. According to that approach, the notion of "Window" involves partitioning a stream into subsets of data observed at different snapshots of time. Data that drops out of the current Window is ignored from the knowledge base. Such an approach allows, on one hand, saving memory and processing resources, while, on the other hand, eliminating irrelevant (i.e. stale) data from the knowledge base. The notion of "continuous processing" involves having a semantic reasoner continuously running to evaluate goals against a constantly changing knowledge base.

Another approach defines a framework for Stream Reasoning that includes a KB cache to host the current window over which reasoning is performed, and a persistent KB to host historic knowledge. Furthermore, this approach defines windows in terms of the number of KB (OWL) individuals they refer to. This guarantees that all statements involving an OWL individual are kept in the current window range. An individual-based window decreases the degree of incompleteness, when compared with a resource description framework (RDF) statement based window, by dropping out groups of RDF statements that refer to the oldest individual in the KB.

These approaches, however, suffer from a number of shortcomings. One shortcoming is that, while the second approach may decrease the degree of knowledge incompleteness, it still does not guarantee completeness of knowledge in any given window. This is not acceptable for some networking scenarios, where e.g. there is a risk of failing to trigger an action based on network data simply because the data was partitioned into two different windows, and therefore when reasoning was performed over each window in isolation, the proper conditions to trigger the desired action were not present in the current snapshot of the KB. Furthermore, another shortcoming common to both approaches is that, when reasoning is performed over complex rules (as e.g. is often the case in the networking domain), processing latency of a semantic reasoner may be larger than the required window refresh rate to guarantee real-time reasoning. In other words, the current approaches do not address the scenario where complex rules are applied over fast changing data.

Communication system 10 is configured to address these issues (among others) to offer a system and method enabling a semantic reasoner to operate over fast changing data. According to various embodiments, the KB 16 is logically divided into n individual KB instances 15-1 through 15-$n$ (n could be any integer greater than 1) and the window pane pre-processor 13 in the semantic reasoner 12 may automatically (e.g., without human intervention) map the data 20 to the different KB instances 15, where the data 20 may be modeled according to the base ontology 34. In an embodiment, the KB instances 15 may be implemented as cache memories.

Further, the reasoning engine 18 is logically divided into n individual reasoning engines instances 17-1 through 17-$n$, each reasoning engine instance 17 of the reasoning engines instances 17-1 through 17-$n$ corresponding to one KB instance of the KB instances 15-1 through 15-$n$, and vice versa. Each reasoning engine instance 17 is an individual representation of the reasoning engine 18 and, therefore, all of the discussions provided herein with respect to the reasoning engine 18 are applicable to each of the reasoning engine instances 17.

As described herein, the window pane pre-processor 13 may ensure/control that the contents of each KB instance 15 is fed to a corresponding one of the reasoning engine instances 17, which may collectively control and manage the network 21 appropriately. In this manner, the window pane pre-processor 13 enables parallel processing of semantic data by multiple semantic reasoning engines, which, in turn, enables the semantic reasoner 12 to operate over fast-changing data.

In particular, as described herein, the window pane pre-processor 13 is configured to carry out a new method that can ensure knowledge completeness and sound inference while allowing parallel semantic reasoning within a given stream window. Such a method may be referred to as a "window pane" algorithm or method.

In addition to enabling semantic reasoners to handle use cases that may involve real-time reasoning over streaming data (such as e.g. troubleshooting protocol FSM, analyzing packet statistics, etc.), the window pane method described herein may cut down on reasoner latency (which may grow exponentially with the size of a KB). The window pane method described herein can apply to any type of streaming data, such as e.g. network data, sensor data, or data generated from social networks.

The window pane method described herein is based on special grouping of rules, therefore, first, a general description of rules is provided.

Within today's networking domain, a preferred embodiment of a semantic reasoner operation is expected to be via Semantic Web Rules Language (SWRL) rule evaluation. SWRL rules have the general form comprising a "Body" and a "Head" and are expressed as "Body→Head." Each of the Body and the Head comprise one or more atoms, where an atom can be either a Class atom or a Property atom, an atom comprising a subject of the atom that references one or more Individuals (i.e. the Individuals may be viewed as subjects of the rules). A Class atom tests or asserts that an Individual is a member of a particular Class. For example, a Class atom "Interface(?x)" may test or assert that an Individual "x" is a member of a Class "Interface" (i.e., that "x" is an interface). A Property atom tests or asserts that an Individual is associated with a given property (i.e. relationship). For example, a Property atom "hasIPv4Address(?x, ?y)" may test or assert that Individual "x" has as its IPv4 address the Individual "y".

When Body of a rule evaluates to TRUE, the rule fires and the statement(s) in the Head is (are) asserted over the KB (over the KB Individuals). For example, a rule to detect IP address collision between two interfaces denoted as "x1" and "x2" may be expressed in SWRL as follows:

hasSameAddressAs(?x1, ?x2), hasSameVFIAs(?x1, ?x2), DifferentFrom (?x1, ?x2)→hasDuplicateAddress(?x1, ?x2)

where "hasSameAddressAs" and "hasSameVFIAs" are Property atoms of the Body of the rule, "DifferentFrom" is a SWRL built-in function, "hasDuplicateAddress" is a Property atom of the Head of the rule, and "x1" and "x2" are KB Individuals (i.e., subjects of the rule). The Body of such a rule is evaluated to TRUE when it is determined that interfaces x1 and x2 have the same address (hasSameAddressAs(?x1, ?x2)), have the same virtual forwarding instance (VFI) (hasSameVFIAs(?x1, ?x2)), and are different from one another (DifferentFrom (?x1, ?x2)). When the Body evaluates to TRUE, such a rule will assert that interface x1 has a duplicate address of interface x2 (hasDuplicateAddress(?x1, ?x2)), as provided in the Head of this rule.

In another example of how the rules are used, an existing semantic approach for policy based networking uses border gateway protocol (BGP) with semantic information (e.g., associated with routes) expressed in an Ontology Web Language (OWL). Policies are expressed using SWRL to provide fine-grained control where the routers can reason over their routes and determine how the routes are to be changed. SWRL rules together with OWL express a BGP ontology defining the routing policy and semantic reasoners may act over the ontology and the rules to generate the router's BGP configuration (e.g. route import/export rules).

As used herein, an "Individual" (e.g. a "KB Individual") refers to an instance of an OWL Class defined in the ontology that specifies the semantic model of the Knowledge Base in question.

While examples provided herein refer to SWRL rules, teachings provided in the present disclosure are equally applicable to any rule language that uses Horn clauses.

Figure 2:
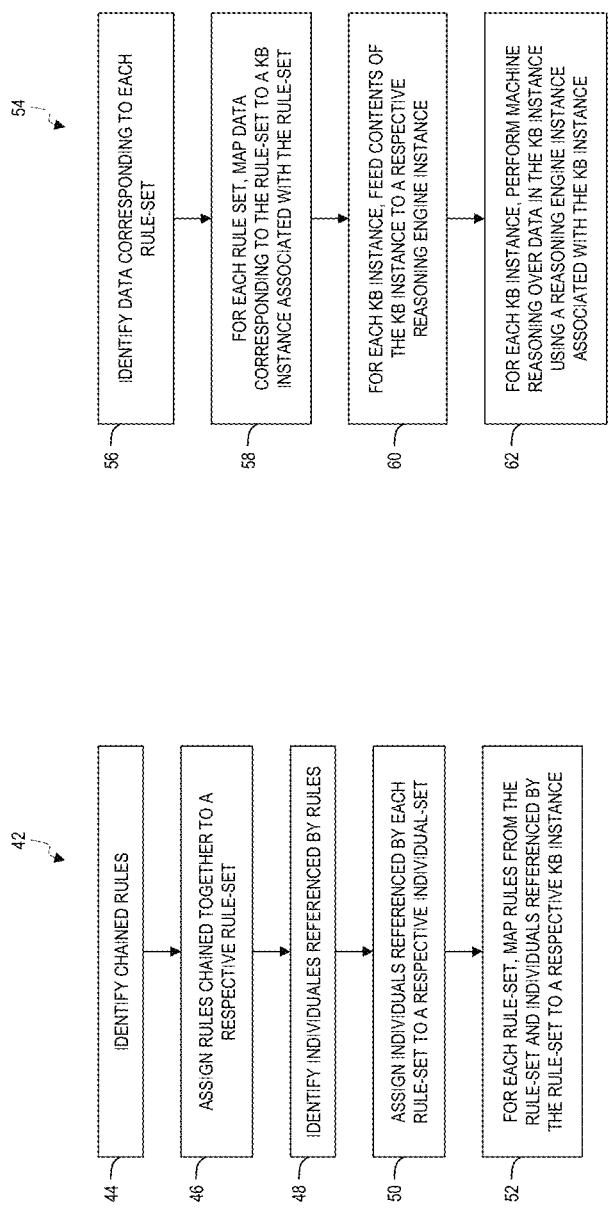
FIGS. 2A and 2B are simplified flow diagrams illustrating example operations that may be associated with embodiments of the communication system, according to various embodiments of the present disclosure.

FIG. 2A is a simplified flow diagram illustrating example operations that may be associated with embodiments of the communication system 10. The operations shown in FIG. 2A outline a computer-implemented window pane method 42 carried out by the window pane pre-processor 13. While method steps of the method 42 are explained with reference to the elements of the communication system 10 of FIG. 1, a person skilled in the art will recognize that any system or network element configured to perform these method steps, in any order, is within the scope of the present disclosure.

As shown in FIG. 2A, the method 42 may begin in step 44, where the window pane pre-processor 13 would examine a plurality of rules of a particular ontology (e.g. rules referenced in the base ontology 34). At that point the rules may be stored, undivided, in the KB 16, in the window pane pre-processor 13 itself or be stored in any other database/memory that the window pane pre-processor 13 may access. In step 44, the window pane pre-processor 13 accesses the rules to identify one or more pairs of chained rules.

In one embodiment, a pair of rules from the plurality of rules are identified as chained when execution of one rule of the pair of rules affects or is affected by execution of another rule of the pair of rules. In one further embodiment, one rule (a first rule) of the pair is affected by execution of another rule (a second rule) if the execution of the other rule (i.e., the second rule) impacts the Individuals of the first rule (i.e., the first rule).

In some embodiments, whether two rules are chained is determined by evaluating body and/or head of the rules. In such embodiments it is assumed that each rule of the pair of rules comprises a body and a head, each of the body and the head comprises one or more atoms, the one or more atoms comprise zero or more Class atoms and zero or more Property atoms, and each of the one more atoms referencing one or more Individuals. In one such embodiment, a pair of rules from the plurality of rules are identified as chained when at least one Class atom comprised in a Head of one rule of the pair of rules is comprised in a Body of another rule of the pair of rules. In another such an embodiment, a pair of rules from the plurality of rules are identified as chained when at least one Property atom comprised in a Head of one rule of the pair of rules is a Property atom in a Body of another rule of the pair of rules and the subject of the Property atom comprised in the Head of one rule references at least one Individual that is also referenced by the subject of the Property atom in the Body of another rule. In yet another such an embodiment, a pair of rules from the plurality of rules are identified as chained when the subject of at least one Class atom comprised in a Head of one rule of the pair of rules references at least one Individual that is also referenced by the subject of at least one Property atom comprised in a Body of another rule of the pair of rules. The conditions of such embodiments include inheritance intersections based on Classes or Properties (since OWL supports Class and Property hierarchies).

While the explanations provided above refer to "pairs of chained rules", step 44 may of course involve that more than two rules are identified as "chained," but those relations could always be broken down to the pairs of chained rules. Therefore, as used herein, the phrase "identifying one or more pairs of chained rules" refers to identifying two or more rules that are chained between one another. For example, if rule A is chained with rule B and rule B is chained with rule C, then rules A, B, and C would be identified as rules that are chained together (even though rule A may not be directly chained to rule C).

Furthermore, for illustrative purposes, a notion of "related" rules is presented. Two (or more) rules are related if their subjects reference or can reference one or more common KB Individuals. In various embodiments, such references may apply to the Head and/or the Body of the rules, and may include inheritance intersections based on Classes or Properties. By definition, if two rules are chained then they are also related, but two rules may be related and not chained.

As an example, referred to in the following as a "10 rule example," consider an ontology that includes, possibly among a plurality of other rules, ten rules (rules 1-10) that are related as follows:

rules 1 and 2 are chained
rules 2 and 3 are chained
rules 4 and 5 are chained
rules 6 and 7 are chained
rules 6 and 8 are chained
rules 1 and 4 are related (but not chained)
rules 5 and 10 are related (but not chained)

This examples illustrates that some rules may be chained while other rules may be related but not chained. The consequences of this differentiation will become clear from the description below.

Figures 3, 4:
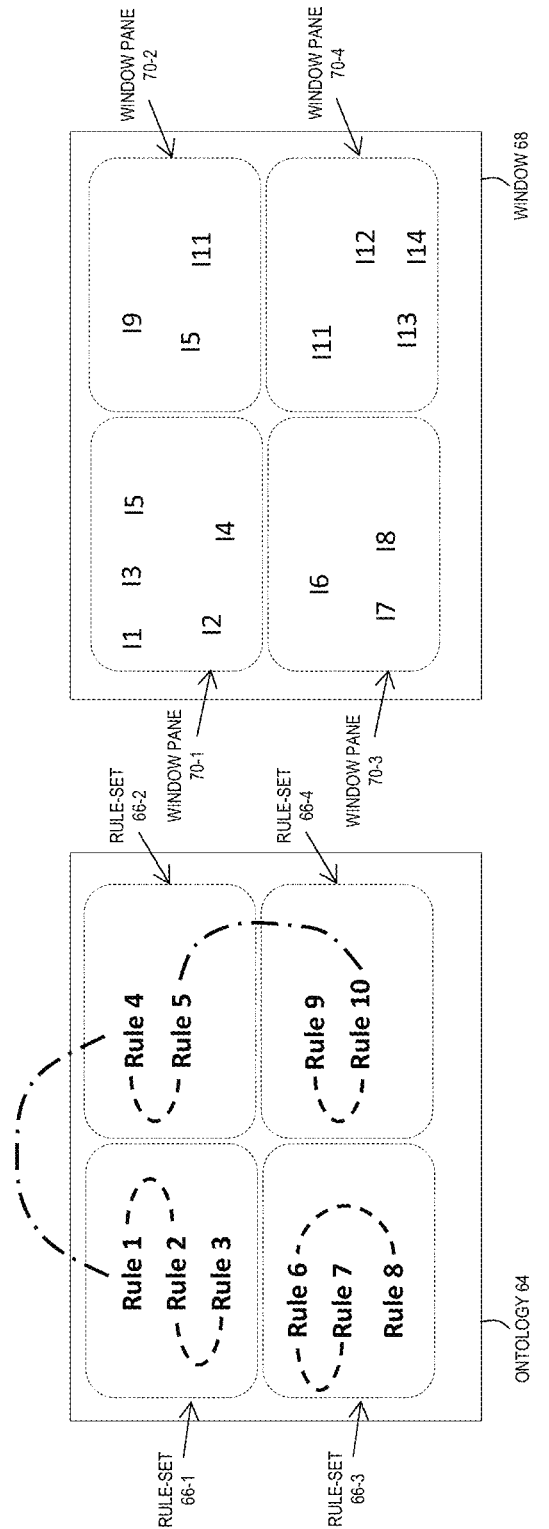
FIG. 3 is a simplified block diagram illustrating different rule-sets of a set of related rules, according to one embodiment of the present disclosure.
FIG. 4 is a simplified block diagram illustrating different individual-sets of a Window corresponding to the set of related rules illustrated in FIG. 3, according to one embodiment of the present disclosure.

Returning back to the method steps illustrated in FIG. 2A, in step 46, the window pane method 42 involves the window pane pre-processor 13 partitioning the related rules into rule-sets, as follows: if two or more rules are chained, then they are assigned to the same rule-set. This is illustrated in FIG. 3, for the 10 rule example described above. FIG. 3 illustrates an ontology 64 comprising the related rules 1-10 assigned to four rule-sets shown as rule-sets 66-1, 66-2, 66-3, and 66-4. The ontology 64 may, of course, comprise further rules which may or may not be related between one another, in particular further clusters of rules related together, but in the interests of clarity the 10 rule example only focuses on a single set of related rules as described above.

As shown in FIG. 3, the rule-set 66-1 includes rules 1, 2, and 3 because these are the rules of the 10 related rules 1-10 that are chained together (rules 1 and 2 are chained and rules 2 and 3 are chained). The rule-set 66-2 includes rules 4 and 5 (because rules 4 and 5 are chained). The rule-set 66-3 includes rules 6, 7, and 8 because these are the rules of the 10 related rules 1-10 that are chained together (rules 6 and 7 are chained and rules 6 and 8 are chained). Finally, the rule-set 66-4 includes rules 9 and 10 (because rules 9 and 10 are chained). The chaining of the rules shown in FIG. 3 with dashed lines surrounding the respective rules in each rule-set, while related rules which are not chained are indicated in FIG. 3 with a dotted-dashed lines connecting them (thus, rules 1 and 4 are shown to be related but not chained, and rules 5 and 10 are shown to be related but not chained). While FIG. 3 illustrates an example with four rule-sets, of course teachings provided herein are applicable to any number of P rule-sets.

Returning back to the method steps illustrated in FIG. 2A, in step 48, the window pane pre-processor 13 may identifying a plurality of individuals referenced by the plurality of rules. In particular, step 48 may include the window pane pre-processor 13 defining physical Stream Windows to be used in the Stream Reasoning techniques, each Stream Window comprising all Individuals referenced by a set of related rules, such as e.g. the rules 1-10 of the 10 rule example. Embodiments of the present disclosure are based on an insight that, in order to preserve completeness of knowledge in a KB, all individuals referenced in a set of related rules must be kept together in the same window of any of the Stream Reasoning techniques. This guarantees that inferences are based on a synchronized snapshot of a current system state.

Furthermore, Individuals within a single window are further classified into non mutually-exclusive groups (individual-sets) referred to as window panes, such that all individuals referenced by rules that belong to the same rule-set are part of the same window pane. Therefore, returning back to the method steps illustrated in FIG. 2A, in step 50, the window pane pre-processor 13 is configured to examine the plurality of individuals referenced by the subjects of the plurality of rules (as identified in step 48) and assigning all individuals referenced by each respective rule-set of the P rule-sets to an individual-set (i.e., a window pane of a window) associated with the each respective rule-set. Thus, there is a one-to-one correspondence between rule-sets and individual-sets where each rule-set is associated with one and only one individual-set and vice versa. This is illustrated in FIG. 4, for the 10 rule example described above.

FIG. 4 illustrates a window 66 comprising all of the individuals of a set of related rules 1-10, in the exemplary illustration of FIG. 4 all of the individuals comprising 14 Individuals I1-14. Because the exemplary set of related rules comprised rules assigned to four rule-sets and there is one-to-one correspondence between the rule-sets and the individual-sets, the individuals I1-14 are assigned to four individual-sets, shown in FIG. 4 as individual-sets 70-1, 70-2, 70-3, and 70-4. The individual-set 70-1 corresponds to the rule-set 66-1, the individual-set 70-2 corresponds to the rule-set 66-2, the individual-set 70-3 corresponds to the rule-set 66-3, and the individual-set 70-4 corresponds to the rule-set 66-4. Again, there could be more windows similar to the window 68 for all of the rules of an ontology 64, but since, in the interests of clarity, the 10 rule example only focuses on a single set of related rules as described above, FIG. 4 only illustrates a single window (i.e., the window corresponding to the related rules 1-10).

As shown in FIG. 4, the individual-set 70-1 includes Individuals I1, I3, I5, I2, and I4 because these are the Individuals referenced in the subjects of the rules of the rule-set 66-1. Similarly, the individual-set 70-2 includes Individuals I9, I5, and I11 because these are the Individuals referenced in the subjects of the rules of the rule-set 66-2. The individual-set 70-3 includes Individuals I6, I7, and I8 because these are the Individuals referenced in the subjects of the rules of the rule-set 66-3. Finally, the individual-set 70-4 includes Individuals I11, I12, I13, and I4 because these are the Individuals referenced in the subjects of the rules of the rule-set 66-4.

Note that the membership of Individuals in window panes is not mutually exclusive (i.e. an Individual may be assigned, i.e. be a member of, more than one window pane). As a matter of fact, at least Individuals shared among related rules, which are non-chained, may be common across the corresponding window panes. This can be seen from the examination of FIG. 4, where Individual I5 is common to the window panes 70-1 and 70-2 (because rules 1 and 4 are related but not chained), and Individual I11 is common to the window panes 70-2 and 70-4 (because rules 5 and 10 are related but not chained). In an embodiment, in order to preserve integrity of data during machine reasoning, an individual may be assigned to more than one individual-set as long as that individual cannot be changed in any of the individual-sets as a result of the respective reasoning engine instances performing machine reasoning in the individual-sets sharing an assignment of that individual.

Returning back to the method steps illustrated in FIG. 2A, in step 52, the window pane pre-processor 13 is configured to construct individual KB instances 15. To that end, the window pane pre-processor 13 is configured to, for each rule-set, map the rules from the rule-set and the individuals from the individual-set associated with that rule-set into a respective KB instance. Thus, each KB instance is associated with a particular rule-set (i.e., there is a one-to-one correspondence between rule-sets and KB instances where each rule-set is associated with one and only one KB instance and vice versa. Because there is also one-to-one correspondence between the rule-sets and individual-sets, this can also be expressed as that each KB instance is associated with a particular individual-set where each individual-set is associated with one and only one KB instance and vice versa.

Figure 5:
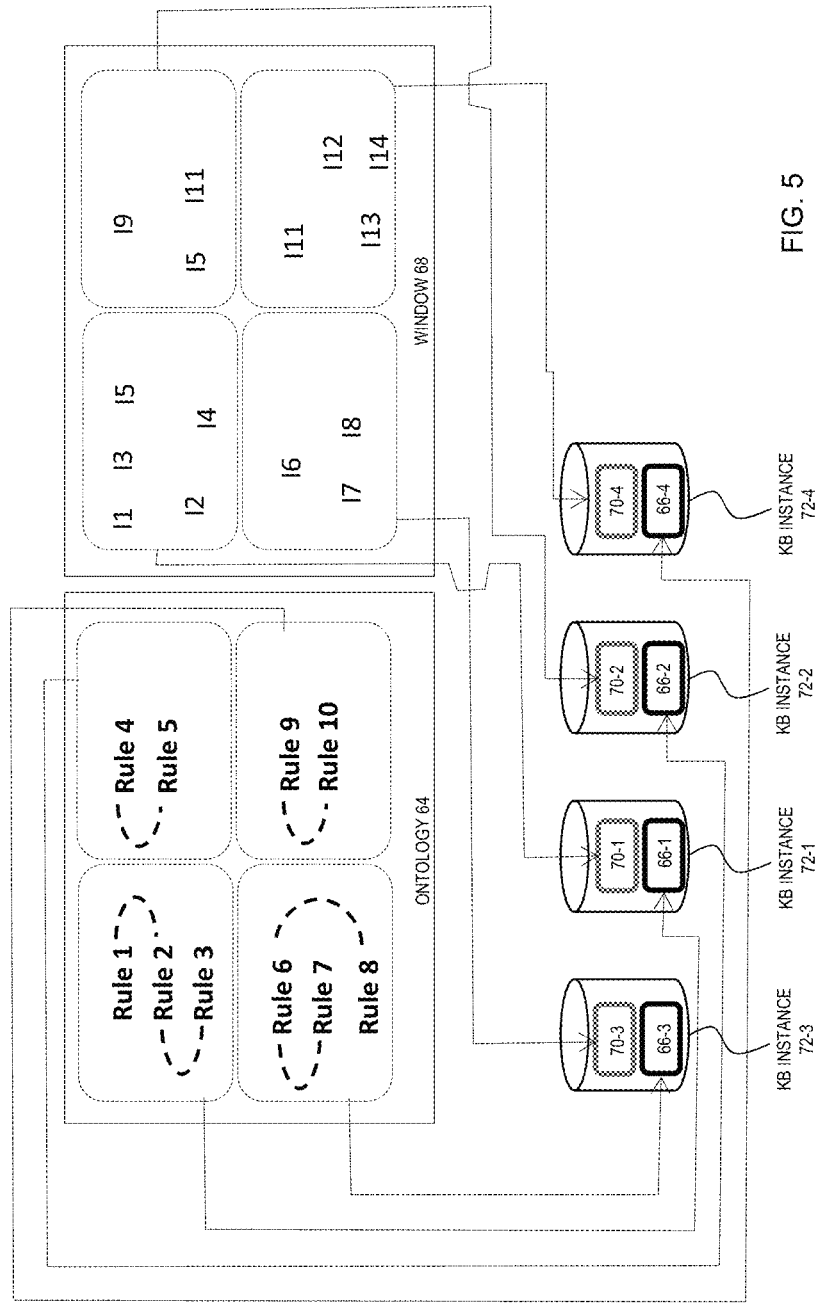
FIG. 5 is a simplified block diagram illustrating mapping of the different rule-sets illustrated in FIG. 3 and individual-sets illustrated in FIG. 4 to respective KB instances, according to one embodiment of the present disclosure.

As stated above, every rule-set is atomic from the standpoint of sound inference and every window pane has complete knowledge for its corresponding rule-set. Hence, for a given physical window in the data stream, it is possible to construct multiple KB instances such that every rule-set is mapped to a KB instance and individuals within a window pane are mapped to the KB instance that hosts the rules associated with the corresponding rule-set. This is illustrated in FIG. 5, where, continuing with the 10 rule example described above, rules from the rule-sets of the ontology 64 of FIG. 3 and individual-sets from the window 68 of FIG. 4 are shown to be mapped to respective different KB instances 72 (which could be KB instances 15 shown in FIG. 1). Since in the example of FIGS. 3 and 4 there are four rule-sets and four individual-sets, there are four different KB instances, shown in FIG. 5 as KB instances 72-1 through 72-4, the content of which is populated as shown with the dotted arrow going from the ontology 64 and the window 68 (i.e., the KB instance 72-1 comprises rule-set 66-1 and individual-set 70-1, etc.).

Thus, the window pane method 42 may be viewed as providing means for segmenting the analysis of data so that only incremental differences may need to be calculated/determined rather than having to re-calculate/re-determine the entire space. The reasoning engine instance associated with a corresponding KB instance is responsible for calculating the inferences associated with its own rule-set over its own individual-set, in isolation of other reasoning engine instances or KB instances. This yields better reasoning performance as opposed to reasoning over the entire rules of the ontology for all Individuals in the Window.

In an embodiment, contents of the KB instances may include Web Ontology Language Description Logics (OWL-DL) ontology files.

Embodiments of the present disclosure are further based on an insight that, in order to guarantee sound inference over a KB, each group of chained rules must be operated on by one semantic reasoner instance (i.e., by the same reasoning engine instance 17). Otherwise, certain inferences will be missed by the semantic reasoner. Thus, based on the window pane method described above, every KB instance 15 associated with a given Window can be reasoned over, independently, by a different Semantic Reasoner instance, such as a different reasoning engine instance 17. Hence, it is possible to exploit parallelism within a given Window of the data stream. In one embodiment, the semantic reasoner 12 may be configured to create a thread-pool of size P, where P is the number of rule-sets in a particular Window being processed at that time, with one KB instance 15 and a corresponding reasoning engine instance 17 per thread.

In an embodiment, all reasoning engine instances 17 may be configured to provide their inferences to a shared Inference cache (not shown in FIG. 1), which could be e.g. implemented within the KB 16, which can be queried. As a result of implementing the window pane algorithm described herein, the inferences in such an Inference cache will be sound and complete.

In an embodiment, the different KB instances 15 may be configured to provide their data to a persistent Cache (not shown in FIG. 1) configured to store historic knowledge of the different states (i.e., rule-sets) of the KB instances, preferably in association with the individual Windows.

FIG. 2B outlines a computer-implemented method 54, which could be a continuation of the method 42 shown in FIG. 2A, focusing this time on how machine reasoning may be performed once the individual KB instances are constructed according to the method 42. Again, while method steps of the method 54 are explained with reference to the elements of the communication system 10 of FIG. 1, a person skilled in the art will recognize that any system or network element configured to perform these method steps, in any order, is within the scope of the present disclosure.

As shown in FIG. 2B, the method 54 may begin in step 56, where the window pane pre-processor 13 would identify data corresponding to each respective rule-set, which is analogous to identifying network data corresponding to each individual-set, since there is one-to-one correspondence between the rule-sets and the individual-sets.

In step 58, for each rule-set, the window pane pre-processor 13 would automatically map the network data corresponding to this respective rule-set to a KB instance associated with this respective rule-set.

In step 60, for each KB instance, the window pane pre-processor 13 would feed contents of the KB instance to a respective reasoning engine instance associated with the KB instance, thereby enabling, in step 62, each individual reasoning engine instance to perform machine reasoning over the data in the corresponding KB instance. In this manner, the individual KB instances are populated with the actual data on which the rules of each individual KB instances can be evaluated by respective reasoning engine instances.

In various embodiments, the base ontology 34 can include a scope of the system 21, network elements in the system 21, and individual protocols and features that run on the network elements. The base ontology 34 may specify concepts (e.g., classes), relationship between concepts (e.g., object properties), data properties (e.g., linking individuals to literals) and individuals (e.g., instances of classes). In a general sense, the base ontology 34 can function as a dictionary for mapping the data 20 into a specific semantics model of the system 21. In one further embodiment of such embodiments, the method 54 may further include steps of (not shown in FIGURES) a processor of the semantic reasoner 12, such as e.g. the processor 38, generating a fully populated semantics model of the system 21 from the data according to a ontology. The step of automatically mapping the data corresponding to the each respective rule-set to the KB instance associated with each rule-set (step 58 described above) would comprise automatically mapping a portion of the fully populated semantics model comprising the network data corresponding to each rule-set. Such an embodiment could advantageously allow mapping portions of a fully populated semantics model onto the individual KB instances so that the portions could be processed separately.

In an embodiment, generating the fully populated semantics model of a system such as e.g. the network 21, may comprise the semantic reasoner 12 receiving the data 20 from the system 21, parsing the received data (e.g. using the parser 28), loading the parsed data into in-memory data structures, accessing a manifest specifying binding between a data definition format (which, in an embodiment, could be a selection from a group consisting of Structure of Management Information (SMI), YANG, and Extensible Markup Language (XML)) and ontology components of the ontology, identifying ontology components associated with the data based on the manifest, and populating the identified ontology components with individuals and properties from the corresponding data structures. Once the ontology has been populated, the methods illustrated in FIGS. 2A and 2B may be carried out.

As used herein, a "semantics model" comprises a conceptual data model (e.g., description of objects represented by computer readable data including a map of concepts and their relationships) in which semantic information is included. The semantics model describes the meaning of its instances, thereby allowing, without human intervention, expression of meaning in any information exchange based on the model. In particular, the semantics model of a system, such as e.g. the system 21, includes a knowledge representation of the system consisting of a framework of semantically related terms. The knowledge representation may include, for example, a directed or undirected graph consisting of vertices (which represent concepts, such as various network elements) and edges (which represent the relations between the concepts). As used herein, the term "semantic reasoner" comprises a software and/or hardware (e.g., application specific integrated circuits, field programmable gate arrays, etc.) able to infer logical consequences from a set of asserted facts and/or axioms.

In various embodiments, the base ontology 34 and manifest 32 may be generated manually (e.g., with programmer input), whereas semantic reasoner 12 may operate substantially automatically (e.g., without programmer input). In other embodiments, the base ontology 34 and manifest 32 may be generated semi-automatically, for example, with minimal human intervention, or completely automatically.

A combination of W3C Web Ontology Language Descriptive Logics (OWL-DL) and W3C Semantic Web Rules Language (SWRL) can be used to define ontologies (e.g., base network ontology 34) capable of declaratively defining facts, policies and rules that govern networking technologies (e.g., associated with network 21) and specify what conditions are true or false for a given 'intent' (e.g., policy, goal, etc.) to hold. Some or all of the policies and rules may be stored separately in policies database 39.

Intent specifications can be expressed in terms of SWRL rules, which use high-level concepts defined in a set of ontologies, thus making the intent specification generic, device-independent and extensible. Meta-policies may be specified for guiding interactions among intents. For example, meta-policies may be used to prioritize intents when multiple intents are applicable in a context. A meta-level vocabulary can define constructs for resolving conflicting overlapping intents. For example, the meta-level vocabulary can be used to create a default conflict resolution rule such that a prohibitive policy overrides permissive policy. The meta-level vocabulary also allows for defining absolute and relative prioritization of intents, thus overriding the default rule. The meta-policies define an automatic conflict resolution diagnosis to respond to situations when intents presented to a network impose conflicting conditions on the overall infrastructure or on one specific network element.

In various embodiments, modeling network data 20 may involve receiving network data 20 at semantic mapper 14. In a general sense, semantic mapper 14 may comprise a portion of an application (e.g., software tool or service) that aids in transformation of data elements from one namespace (e.g., SMI, YANG, or XML) into another namespace (e.g., OWL-DL). Parser 28 in semantic mapper 14 may parse network data 20 and load the parsed network data 20 into in-memory data structures, which can include Java classes. Generator 30 may access manifest 32 specifying binding between network data types and base network ontology 34. Generator 30 may generate a fully populated semantics model from the data structures using manifest 32 and network data values. Thus, according to various embodiments, communication system 10 can facilitate developing a semantic model of network 21. Network data 20 available within network 21 may be projected onto the semantic models.

In some embodiments, the fully populated semantics model may comprise an OWL-DL file(s), which may be saved into NKB 16. In various embodiments, NKB 16 may comprise mined network data 20 that has been projected against base network ontology 34 (which may be defined by various authorities, such as a plurality of organizations, persons, domains, departments, etc.). In various embodiments, NKB 16 may be written using OWL-DL and SWRL. According to various embodiments, NKB 16 can be configured as any suitable database, table, array, data structure, etc. that allows reasoning engine 18 to access NKB 16 and perform reasoning operations thereon. In some embodiments, NKB 16 comprises an OWL-DL ontology with classes, subclasses, properties and instances representing network 21. NKB 16 can act as a centralized database of information in some embodiments, permitting search queries to be run on the contents therein. In a general sense, NKB 16 comprises a machine readable tangible non-transitory medium for storing information in any suitable format. In various embodiments, NKB 16 can comprise a dynamic storehouse of information, capable of learning and updating network related information associated with network 21.

According to various embodiments, reasoning engine 18 may perform machine reasoning over network data 20 in network knowledge base 16 and make inferences suitable for controlling and managing network 21. In various embodiments, the machine reasoning may be according to pre-configured rules and policies, for example, in policies database 39. At least some rules, policies and meta-policies in policies database 39 may be external to base network ontology 34 and accordingly not part of the semantics model in NFB 16. The external rules, policies and meta-policies may be input by a user, administrator, etc. Some of the rules, policies and meta-policies may be particular (e.g., proprietary) to a provider of network 21 in some embodiments; some of the rules, policies and meta-policies may be common among all network providers in other embodiments.

In an example embodiment, reasoning engine 18 comprises an artificial intelligence (AI) engine that uses network data 20 and user defined policies for the management and control of network 21. In particular embodiments, reasoning engine 18 may operate over NKB 16 and provide basic reasoning functions available with Descriptive Logics (DL), such as consistency checking, inference and concept coverage (e.g., satisfiability verifications). The reasoning can be used to control and manage network 21 appropriately. For example, reasoning engine 18 may trigger generation of action(s) and/or report(s) 40 that can cause changes in network configuration, alert human operators, and otherwise facilitate controlling and managing network 21.

In an example embodiment, reasoning engine 18 can detect if any of network data 20 is inconsistent based on rules specified in base network ontology 34, and trigger a suitable action. For example, policies database 39 indicates a rule from base network ontology 34 that interfaces on distinct routers are distinct in their virtual routing and forwarding instance (VRF) and IP address combination across the network. Assume that network 21 includes two interfaces, on distinct routers, where interfaces are the same. Reasoning engine 18 may instantiate the rule with the data about the interface instances and flags that an inconsistency is found. Thus, reasoning engine can automatically detect that two interfaces configured on two distinct routers with the same virtual routing and forwarding instance (VRF) and same IP address, and trigger corrective action based on preset rules (such as pick the next available IP address in the subnet) in policies database 39.

Reasoning engine 18 can also infer logical consequences based on a set of asserted facts and/or axioms. For example, reasoning engine 18 may detect that a particular router's control plane is being subjected to a denial of service attack from a given source IP, based on examining traffic statistics and central processing unit (CPU)/memory utilization and trigger, for instance, installation of an access control list (ACL) to filter traffic from that malicious source.

In some embodiments, reasoning engine 18 can solve a concept coverage problem (CCoP), for example, for service composition and resource identification. For example, reasoning engine 18 can identify paths available from source A to destination B that do not traverse a specific autonomous system. In another example, reasoning engine 18 can determine whether a specific route to a destination prefix leaves political borders of Canada, etc. Reasoning engine 18 can trigger a report back of a degree of deviation between a request and current state of the network. In an example embodiment, reasoning engine 18 can determine whether an application's intent is satisfiable in an SDN context given the current state of the network, and if not, can trigger a report back of the 'semantic distance' (e.g., degree of divergence) between the intent and the current state.

Additionally, reasoning engine 18, running on a central server or embedded in one or more network elements within or outside network 21, can use meta-information to automatically merge intents from multiple controllers and generate a target configuration that meets the combined requirements. As used herein, the term 'network element' is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In some embodiments, reasoning engine 18 may be embodied in one or more instances executing on one or more network elements within or outside network 21.

The one or more reasoning engine 18 instances may follow the semantics defined by the policy language. Consequently, the steps in merging policies can be formally verified using a logical model. To combine multiple intents, the semantic language can depend on open-world assumption reasoning (e.g., in an open-world assumption reasoning, "positive" assertions may be made; absence of an assertion does not mean the absent assertion is false). In such open-world assumption reasoning, NKB 16 may be incrementally developed, and is not required to be complete to be useful. In such embodiments, communication system 10 may cause rules to be evaluated by the knowledge contained within NKB 16. For example, such restrictions can allow reasoning engine 18 to yield a solution in a finite time. By utilizing semantic technologies to drive the framework, it may be possible to realize dynamic reconfiguration of knowledge as new facts can be inferred through the policies specified. Any suitable tool may be used to drive the ontology specification of base network ontology 34, reasoning engine 18, etc. to build and deploy embodiments of communication system 10 on a large scale.

In various embodiments, complexity of the policy specification mechanism can be relevant to ease of its acceptance. A declarative policy language that enables each authority to draft abstract policies in a high-level language can be a good candidate for policy specification. Each authority can define only those objectives and constraints that are relevant to its needs. The information expressed by the policy language can be defined in a manner that is as hardware, software, and protocol independent as possible. Therefore, according to embodiments of communication system 10, authorities need not focus on writing procedures for configuring a specific network infrastructure; instead they can focus on describing a generic infrastructure and its features without needing to master and understand the various device/protocol/system specific mechanisms. The semantic reasoning elements of semantic reasoner 12 can convert substantially any specified policy into device specific configurations.

Embodiments of communication system 10 can provide a method and apparatus for building semantic NKB 16 using semantic mapper 14, which takes as input user-defined base network ontology 34, a set of SMI/YANG/XML comprising network data 20, and generates a fully populated OWL-DL ontology represented as a semantic model that can be acted upon by reasoning engine 18, to achieve at least the following:—consistency checking of network and device operation and configuration (e.g., detecting and remedying overlapping IP address assignment); inference of states or consequences based on a set of facts (e.g., detecting denial of service attacks and isolating the malicious source); verifying the satisfiability of a concept (e.g. in SDN context, verifying whether an application's intent is satisfiable given the state of the network).

Embodiments of communication system 10 can enable embedding artificial intelligence in network 21, through semantic reasoner 18, either on the network elements themselves or on an SDN controller. One of the advantages that can be realized with embodiments of communication system 10 may include automatic generation of NKB 16 from network data 20 (e.g., in form of SMI/YANG modules/XML files) using as input base network ontology 34, which can describe basic rules and principles of networking, and formally describe business rules and advanced policies of the network. Additionally, embodiments of communication system 10 can be applied across substantially all network technologies and protocols (e.g., Layer 2, Layer 3, etc.). Embodiments of communication system 10 may also provide a mechanism for performing machine reasoning over network Big Data.

Turning to the infrastructure of communication system 10, the network topology of network 21 can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, semantic reasoner 12 can comprise a software application executing using processor 38 and memory element 36. In some embodiments, semantic reasoner 12 may be instantiated on a server comprising memory element 36 and processor 38. In other embodiments, semantic reasoner 12 may be instantiated on another network element comprising memory element 36 and processor 38. In yet other embodiments, semantic reasoner 12 may comprise a stand-alone appliance including memory element 36 and processor 38, connected to the network, and operable to execute various operations as described herein. In yet other embodiments, semantic reasoner 12 may comprise a distributed application, with different elements (e.g., semantic mapper 14, NKB 16, reasoning engine 18) instantiated on separate physical or virtual machines.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, semantic reasoner 12, in particular window pane pre-processor 13. In some embodiments, one or more of these features may be implemented in hardware, provided external to these elements, or consolidated in any appropriate manner to achieve the intended functionality. The various network elements (e.g., semantic reasoner 12, in particular window pane pre-processor 13) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, semantic reasoner 12, in particular window pane pre-processor 13, described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 36) can store data used for the operations described herein. This includes the memory element being able to store instructions (e.g., software, logic, code, etc.) in non-transitory computer-readable storage media, such that the instructions are executed to carry out the activities described in this Specification. A processor can execute any type of instructions associated with the data to achieve the operations detailed herein in this Specification. In one example, processors (e.g., processor 38 or window pane pre-processor 13) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing and sequence of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a semantic reasoner in a computer network for controlling and managing the computer network, the method comprising:
    identifying, from a plurality of rules associated with controlling or managing the computer network, one or more pairs of chained rules, wherein a pair of rules from the plurality of rules is identified as chained when at least one property atom in a head of one rule of the pair of rules is a property atom in a body of another rule of the pair of rules and a subject of the property atom in the head of the one rule references at least one individual that is referenced by a subject of the property atom in the body of the another rule;
    from the one or more pairs of chained rules, assigning rules chained together to a respective rule-set of P rule-sets;
    from a plurality of individuals referenced by the plurality of rules, assigning individuals referenced by each rule-set of the P rule-sets to an individual-set associated with each rule-set;
    mapping the rules from each rule-set and the individuals from the individual-set associated with each rule-set into a respective knowledge base (KB) instance associated with each rule-set;
    identifying portions of streaming data obtained from one or more network elements within the computer network that correspond to each rule-set;
    automatically mapping each portion of the streaming data corresponding to each rule-set to the respective KB instance associated with each rule-set;
    feeding contents of each KB instance to a respective reasoning engine instance associated with each KB instance;
    performing machine reasoning over the portion of streaming data in each KB instance using the respective reasoning engine instance associated with each KB instance;
    providing inferences obtained from each reasoning engine instance to a shared inference cache; and
    using the inferences in the shared inference cache to control and manage the computer network.

2. The method according to claim 1, wherein the pair of rules from the plurality of rules is further identified as chained when:
    execution of one rule of the pair of rules affects or is affected by execution of another rule of the pair of rules, or
    at least one class atom in a head of one rule of the pair of rules is in a body of another rule of the pair of rules, or
    a subject of at least one class atom in a head of one rule of the pair of rules references at least one individual that is referenced by a subject of at least one property atom in a body of another rule of the pair of rules.

3. The method according to claim 1, wherein identifying portions of streaming data that correspond to each rule-set further comprises parsing the identified portions of streaming data into a respective data structure associated with a respective rule-set.

4. The method according to claim 1, wherein performing machine reasoning comprises at least two reasoning engine instances performing machine reasoning in parallel.

5. The method according to claim 1, wherein the machine reasoning is performed by each reasoning engine instance according to the rule-set associated with the reasoning engine instance.

6. The method according to claim 1, further comprising:
    using the inferences in the shared inference cache to change at least one network configuration associated with the computer network.

7. The method according to claim 1, further comprising:
    generating a fully populated semantics model of the computer network from the streaming data according to an ontology,
    wherein the automatically mapping each portion of the streaming data corresponding to each rule-set to the KB instance associated with each rule-set comprises automatically mapping a portion of the fully populated semantics model comprising the portion of streaming data corresponding to each rule-set.

8. One or more non-transitory computer readable storage media encoded with software comprising computer executable instructions for controlling and managing a computer network and, when the software is executed, operable to:
    identify, from a plurality of rules associated with controlling or managing the computer network, one or more pairs of chained rules, wherein a pair of rules from the plurality of rules is identified as chained when at least one property atom in a head of one rule of the pair of rules is a property atom in a body of another rule of the pair of rules and a subject of the property atom in the head of the one rule references at least one individual that is referenced by a subject of the property atom in the body of the another rule;
    from the one or more pairs of chained rules, assign rules chained together to a respective rule-set of P rule-sets;
    from a plurality of individuals referenced by the plurality of rules, assign individuals referenced by each rule-set of the P rule-sets to an individual-set associated with each rule-set;
    map the rules from each rule-set and the individuals from the individual-set associated with each rule-set into a respective knowledge base (KB) instance associated with each rule-set;
    identify portions of streaming data obtained from one or more network elements within the computer network corresponding to each rule-set;
    automatically map each portion of the streaming data corresponding to each rule-set to the respective KB instance associated with each rule-set;
    feed contents of each KB instance to a respective reasoning engine instance associated with each KB instance;
    perform machine reasoning over the portion of streaming data in each KB instance using the respective reasoning engine instance associated with each KB instance;
    provide inferences obtained from each reasoning engine instance to a shared inference cache; and
    use the inferences in the shared inference cache to control and manage the computer network.

9. The one or more non-transitory computer readable storage media according to claim 8, wherein the pair of rules from the plurality of rules is further identified as chained when:
    execution of one rule of the pair of rules affects or is affected by execution of another rule of the pair of rules, or at least one class atom in a head of one rule of the pair of
rules is in a body of another rule of the pair of rules, or
a subject of at least one class atom in a head of one rule
of the pair of rules references at least one individual
that is referenced by a subject of at least one property
atom in a body of another rule of the pair of rules.

10. The one or more non-transitory computer readable storage media according to claim 8, further operable to identify portions of streaming data that correspond to each rule-set by parsing the identified portions of streaming data into a respective data structure associated with a respective rule-set.

11. The one or more non-transitory computer readable storage media according to claim 8, further operable to perform machine reasoning using at least two reasoning engine instances performing machine reasoning in parallel.

12. The one or more non-transitory computer readable storage media according to claim 8, further operable to:
use the inferences in the shared inference cache to change at least one network configuration associated with the computer network.

13. The one or more non-transitory computer readable storage media according to claim 8, further operable to:
generate a fully populated semantics model of the computer network from the streaming data according to an ontology; and
automatically map each portion of the streaming data corresponding to each rule-set to the KB instance associated with each rule-set by automatically mapping a portion of the fully populated semantics model comprising the portion of streaming data corresponding to each rule-set.

14. A system for enabling semantic reasoning in a computer network for controlling and managing the computer network, the system comprising:
at least one memory configured to store computer executable instructions, and
at least one processor coupled to the at least one memory and configured, when executing the instructions, to:
identify, from a plurality of rules associated with controlling or managing the computer network, one or more pairs of chained rules, wherein a pair of rules from the plurality of rules is identified as chained when at least one property atom in a head of one rule of the pair of rules is a property atom in a body of another rule of the pair of rules and a subject of the property atom in the head of the one rule references at least one individual that is referenced by a subject of the property atom in the body of the another rule;
from the one or more pairs of chained rules, assign rules chained together to a respective rule-set of P rule-sets;
from a plurality of individuals referenced by the plurality of rules, assign individuals referenced by each rule-set of the P rule-sets to an individual-set associated with each rule-set;
map the rules from each rule-set and the individuals from the individual-set associated with each rule-set into a respective knowledge base (KB) instance associated with each rule-set;
identify portions of streaming data obtained from one or more network elements within the computer network corresponding to each rule-set;
automatically map each portion of the streaming data corresponding to each rule-set to the respective KB instance associated with each rule-set;
feed contents of each KB instance to a respective reasoning engine instance associated with each KB instance;
perform machine reasoning over the portion of streaming data in each KB instance using the respective reasoning engine instance associated with each KB instance;
provide inferences obtained from each reasoning engine instance to a shared inference cache; and
use the inferences in the shared inference cache to control and manage the computer network.

15. The system according to claim 14, wherein the pair of rules from the plurality of rules is further identified as chained when:
execution of one rule of the pair of rules affects or is affected by execution of another rule of the pair of rules, or
at least one class atom in a head of one rule of the pair of rules is in a body of another rule of the pair of rules, or
a subject of at least one class atom in a head of one rule of the pair of rules references at least one individual that is referenced by a subject of at least one property atom in a body of another rule of the pair of rules.

16. The system according to claim 14, wherein the at least one processor is configured to identify portions of streaming data that correspond to each rule-set by parsing the identified portions of streaming data into a respective data structure associated with a respective rule-set.

17. The system according to claim 14, wherein the at least one processor is configured to perform machine reasoning using at least two reasoning engine instances performing machine reasoning in parallel.

18. The system according to claim 14, wherein the machine reasoning is performed by each reasoning engine instance according to the rule-set associated with the reasoning engine instance.

19. The system according to claim 14, wherein the at least one processor is further configured to:
use the inferences in the shared inference cache to change at least one network configuration associated with the computer network.

20. The system according to claim 14, wherein the at least one processor is further configured to:
generate a fully populated semantics model of the computer network from the streaming data according to an ontology; and
automatically map each portion of the streaming data corresponding to each rule-set to the KB instance associated with each rule-set by automatically mapping a portion of the fully populated semantics model comprising the portion of streaming data corresponding to each rule-set.

* * * * *